Patented Apr. 7, 1953

2,634,280

UNITED STATES PATENT OFFICE 2,634,280

PROCESS FOR THE EXTRACTION OF RHENIUM AND ANALOGOUS ELEMENTS

Suzanne Marie Françoise Tribalat and Marcel Michel Bertolus, Paris, France, assignors to S. I. F. E. M., San Lucar, Tangier, a corporation of Tangier No Drawing. Application May 25, 1948, Serial No. 29,199. In France March 6, 1948

9 Claims. (Cl. 260—429)

The present invention relates to a process for extracting an element belonging to column VII of Mendeliev's periodical classification, even when the element is present only in trace quantities, from ores or from products of ore treatment, and the invention is particularly directed to a process for extracting rhenium.

It is known that rhenium is present in certain ores and particularly in molybdenites, only in very small quantities.

The extraction of these traces of rhenium in the presence of a large quantity of molybdenum is very difficult.

In accordance with the present invention there is provided a process which permits the total extraction of rhenium in the form of a pure compound from aqueous solutions containing rhenium compounds and molybdenum compounds such as the aqueous solutions of molybdate and perrhenate which are obtained by known treatment of ores such as molybdenite by oxidizing attack either in an alkaline medium or in acid medium. This process is characterized by the following steps:

(1) The solution containing the perrhenate and molybdate is adjusted to an alkaline pH, for example, a pH between 8 and 9.

(2) An organic compound A is added to the solution, this compound forming with the perrhenic ions an organic perrhenate which is then extracted by exhausting the solution by means of a solvent for reagent A, e. g. chloroform, which also dissolves the organic perrhenate.

(3) The organic solvent phase, e. g. chloroform, containing the reagent A and the organic perrhenate, is separated from the aqueous phase in which the molybdate remains.

The above-mentioned reagent A which is used in accordance with the invention is a complex ion having the structure

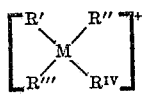

in which the central atom M belongs to the first group of column V of Mendeliev's periodical classification (N, P, As, Sb, Bi) and which is attached to organic radicals R', R'', R''', R$^{IV}$, the said radicals being heavier the lighter the central atom. These radicals are selected to permit the formation of saline compounds of the ion

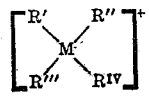

which have a relatively high solubility in water, while the anion combined with the ion

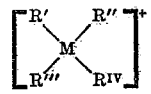

is usually a light anion such as Cl$^-$. The organic perrhenates formed with the above described reagent A are insoluble in water but soluble in organic solvents. Examples of reagent A are water-soluble tetraphenylarsonium salts, e. g. tetraphenylarsonium chloride. Also suitable are derivatives of such salts which have substituted phenyl radicals. The phenyl radicals are responsible for the solubility of the perrhenate in organic solvents such as chloroform.

The complex compound, i. e. the organic perrhenate, formed by the reaction of reagent A with the perrhenate is destroyed by shaking the organic solution containing it, along with the excess of the reagent A used, with an aqueous solution which will prevent the reagent from passing into an ionized state while simultaneously causing the liberation of perrhenate ions.

Such an aqueous solution may be a concentrated acid, for example, 12 N hydrochloric acid, a concentrated acid containing an added reducing agent, a concentrated solution of a mineral chloride, or a solution of ions which will form with the reagent A a precipitate that is less soluble than the perrhenate, for example, a solution of perchloric ions (ClO$_4^-$).

The aqueous phase which now contains rhenium is separated from the organic solvent phase which contains all of the liberated organic reagent (except in the case when one has used a solution of ions which precipitate the reagent as a substantially insoluble compound).

Metallic rhenium may be recovered from this aqueous solution by known means.

The following is a specific example of the extraction and recovery of rhenium from molybdenite in accordance with the invention.

The ore is brought into aqueous solution in known manner by means of oxidizing attack, for example, with nitric acid. The solution thus obtained contains molybdenum in its hexavalent form and rhenium in its heptavalent form (ReO$_4^-$ ions). In accordance with chemical practice in the metallurgy field, the following steps are carried out under normal atmospheric conditions except where otherwise indicated.

The pH of the solution is adjusted to about 8–9. To this solution there is added reagent A, e. g. tetraphenylarsonium chloride or one of its derivatives, the reagent A forming complex compounds with the ReO$_4^-$ ions. The reagent, which is added in an excess over that required to combine with the ReO$_4^-$ ions present in the solution, at the above pH, acts selectively on the perrhenate ions to form the perrhenate complex. The thus formed complex is then extracted from the aqueous solution by agitating the solution with an organic solvent, e. g. chloroform, in sufficient quantity to dissolve both the rhenium complex and the excess reagent A.

The organic solvent phase containing the rhenium complex and the excess reagent is then separated from the aqeous phase which contains the hexavalent molybdenum ions. To recover rhenium from the organic complex in which it is present, the organic solvent solution is first dried over a desiccant, e. g. calcium chloride, in order to remove traces of aqueous molybdate solution which may be present in the organic solvent solution. Then a solution B, e. g. 12 N hydrochloric acid, is added to the organic solution separation from the desiccant and is agitated therewith. After agitation, the aqueous phase is found to contain rhenium while the organic solvent phase contains the liberated reagent A, which can be readily recovered for reuse.

The passage of rhenium into the aqueous phase may be explained as follows: solution B is chosen so that it does not allow the reagent A to exist therein in the state of ions; as the rhenium concentration in the solvent is proportional to the concentration of its ions

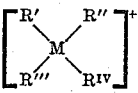

it can therefore be decreased to such an extent that practically all of rhenium exists in the aqueous phase in the state of ReO$_4^-$ ions.

These rhenium ions can be reduced to metallic rhenium by known methods. To this end the greater part of the aqueous solution is distilled until rhenium begins to pass into the distillate; the non-distilled fraction is neutralized if need be and rhenium oxide is reduced at 1,000° C. by hydrogen. Metallic rhenium is thus obtained in admixture with alkaline salts, the latter being readily eliminated by washing with water.

What we claim is:

1. A process for the extraction of an element belonging to column VII of the periodic classification (F, Cl, Br, I, Mn, Tc, Re, Astatine, Neptunium) from raw materials containing said elements even as traces, comprising attacking said raw material by a chemical reagent able to form an aqueous solution containing said elements in the form of anions, adding to said aqueous solution an organic reagent consisting of tetraphenylarsonium chloride, then adding an organic solvent for selectively dissolving the compound formed by the anions of the element to be extracted and the tetraphenylarsonium cations, and separating the two liquors after said compound has been extracted by the solvent from said aqueous solution.

2. A process for the extraction of rhenium from raw materials containing molybdenum and rhenium, the latter even in trace quantity, comprising: dissolving the raw material in nitric acid so that the solution contains molybdenum in its hexavalent state and rhenium in its heptavalent state; adding an alkaline substance to said solution to adjust the pH thereof to a value of 6 to 13; adding to said solution a water soluble tetraphenylarsonium salt to form a compound of the form $$(C_6H_5)_4AsReO_4$$

adding chloroform thereto and agitating both liquids to achieve the above reaction and to extract by chloroform the compound formed within the aqueous solution; separating the solvent phase from the aqueous phase; attacking the chloroform phase by an aqueous solution of commercial hydrochloric acid for destroying the compound $(C_6H_5)_4AsReO_4$, and separating the aqueous phase containing the element to be extracted.

3. A process for the extraction of an element of column VII of the periodic classification from raw materials containing said elements even in trace quantities, which comprises treating said raw material with a chemical reagent to form an aqueous solution containing said elements in the form of anions, adding to said solution a water-soluble salt of a quaternary organic base having the general formula

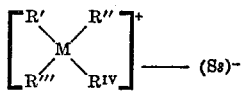

wherein M is an element of the first group of column V of the periodic classification and R', R'', R''' and R$^{IV}$ are organic radicals selected from the group consisting of phenyl radicals and substituted phenyl radicals permitting water solubility of said salt and Ss is an anion forming a water-soluble salt with the cation of said quaternary base, whereby to form compounds containing anions of the element to be extracted and cations of said quaternary base, adding a water-immiscible organic solvent to selectively dissolve said compound and separating the solvent from the aqueous solution.

4. A process as defined in claim 3 wherein the said water soluble salt of a quaternary organic base is a chloride.

5. A process as defined in claim 3 wherein said organic radicals are substituted phenyl radicals permitting water solubility of said salt.

6. A process as defined in claim 3 further comprising the steps of decomposing the said compound contained in the organic solvent by adding to said solvent an acid aqueous solution containing anions effective to cause the anions containing the element to be extracted to pass in an ionized condition in said aqueous solution, and separating said solvent from the aqueous solution containing said element.

7. A process as defined in claim 3 wherein said organic radicals are phenyl radicals.

8. A process as defined in claim 3 wherein the aqueous solution is adjusted to an alkaline pH before the addition thereto of said salt.

9. A process for the extraction of a metal element of column VII of the periodic classification from raw materials containing said elements even in trace quantities, which comprises treating said raw material with a chemical reagent to form an aqueous solution containing said elements in the form of anions, adding to said solution a water-soluble salt of a quaternary organic base having the general formula

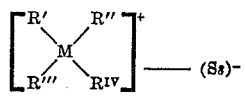

wherein M is an element of the first group of column V of the periodic classification and R', R'', R''' and R$^{IV}$ are organic radicals selected from the group consisting of phenyl radicals and substituted phenyl radicals permitting water solubility of said salts and $S_s$ is an anion forming a water-soluble salt with the cation of said quaternary base, whereby to form compounds containing anions of the elements to be extracted and cations of said quaternary base, adding a water-immiscible organic solvent to selectively dissolve said compound and separating the solvent from the aqueous solution.

SUZANNE MARIE FRANÇOISE TRIBALAT.
MARCEL MICHEL BERTOLUS.

REFERENCES CITED

The following references are of record in the file of this patent:

UNITED STATES PATENTS

| Number | Name | Date |
| --- | --- | --- |
| Re. 15,931 | Wighton et al. | Oct. 14, 1924 |
| 714,914 | Keith | Dec. 2, 1902 |
| 1,099,388 | McCormack | June 9, 1914 |
| 1,238,279 | Dwight | Aug. 28, 1917 |
| 1,290,181 | Hall | Jan. 7, 1919 |
| 2,048,112 | Gahl | July 21, 1936 |
| 2,227,833 | Hixson et al. | Jan. 7, 1941 |
| 2,230,322 | Flannery | Feb. 4, 1941 |

OTHER REFERENCES

Industrial and Engineering Chemistry, Analytical Edition, vol. 11, 1939, pages 186–188.